United States Patent [19]

Arthurs et al.

[11] Patent Number: 4,873,681

[45] Date of Patent: Oct. 10, 1989

[54] HYBRID OPTICAL AND ELECTRONIC PACKET SWITCH

[75] Inventors: Edward Arthurs, Summit; Matthew S. Goodman, Belle Mead; Haim Kobrinski, Andover; Mario P. Vecchi, Morris Plains, all of N.J.

[73] Assignee: Bell Communications Research, Inc., Livingston, N.J.

[21] Appl. No.: 147,445

[22] Filed: Jan. 26, 1988

[51] Int. Cl.[4] .............................................. H04B 9/00
[52] U.S. Cl. ........................................... 370/3; 370/4; 455/608; 455/617
[58] Field of Search ............... 455/600, 606, 607, 608, 455/612, 618, 617, 619; 370/3, 4

[56] References Cited

U.S. PATENT DOCUMENTS

| | | | |
|---|---|---|---|
| 4,074,142 | 2/1978 | Jackson | 455/612 |
| 4,417,334 | 11/1983 | Gunderson | 370/1 |
| 4,450,554 | 5/1984 | Steensma | 370/4 |
| 4,630,254 | 12/1986 | Tseng | 455/607 |

OTHER PUBLICATIONS

J. Y. Hui & E. Arthurs, "A Broadband Packet Switch for Integrated Transport", IEE Journal on Selected Areas in Comm., vol. SAC-5, No. 8, Oct. 1987.
L. T. Wu et al., "Dynamic TDM-A Packet Approach to Broadband Networking", IEEE Conference on Communications, Settle, Wash. 1987.
H. Kobrinski et al., "Demonstration of High Capacity In The Lambdanet Architecture: A Multiwavelength Optical Network", Electronic Letters, Jul. 1987, vol. 23, No. 16, pp. 824-828.
E. Arthurs et al., "Multiwavelength Optical Cross Connect in Pararallel Processing Computers", Electronics Letters, 21, Jan. 1988, vol. 24, No. 2, pp. 119-120.
A. M. Weiner et al., "Frequency of Domain Coding of Femto Second Pulses for Spread Spectrum Communications", Proceedings of Conference on Lasers and Electro-optics,
26 Apr.-1 May 1987, Baltimore, Maryland.

Primary Examiner—Robert L. Griffin
Assistant Examiner—Leslie Van Beek
Attorney, Agent, or Firm—James W. Falk

[57] ABSTRACT

A switch for receiving packets on optical fiber input trunks and for switching the packets to appropriate optical fiber output trunks is disclosed. The packet switch is a hybrid switch comprising both optical and electronic devices and specifically comprises and electronic input buffer, an optical transport network and an optical control network. The optical transport network prevents internal collisions within the switch and the optical control network prevents external collisions of packets. The packet switch exploits the inherent properties of optical and electronic devices for the specific functions they are best suited for.

12 Claims, 4 Drawing Sheets

| TIME SLOT | 1 | 2 | 3 | 4 |
|---|---|---|---|---|
| INPUT PORT 1 | A, 2 | B, 3 | A, 2 | |
| 2 | C, 1 | | D, 4 | |
| 3 | | | | |
| 4 | E, 3 | | E, 3 | |

| CALL | INPUT PORT | OUTPUT PORT | BANDWIDTH |
|---|---|---|---|
| A | 1 | 2 | 2 |
| B | 1 | 3 | 1 |
| C | 2 | 1 | 1 |
| D | 2 | 4 | 1 |
| E | 4 | 3 | 2 |

HYBRID OPTICAL AND ELECTRONIC PACKET SWITCH

FIELD OF THE INVENTION

The present invention relates to a packet switch and, more particularly, to a hybrid packet switch comprising both optical and electronic devices for receiving data packets on optical fiber input trunks and for switching them to appropriate optical fiber output trunks.

BACKGROUND OF THE INVENTION

Future public telecommunications networks are likely to be based on optical fiber transport and are expected to support a heterogeneous mix of broadband services. In order to enable design flexibility for these networks, statistical packet switching techniques will probably be used to achieve uniform switching and multiplexing of multiple bit rate data streams. An example of such a statistical packet switching technique is Dynamic Time Division Multiplexing (see, e.g. "Dynamic Time Division Multiplexing," U.S. patent application Ser. No. 118,977 filed on Nov. 10, 1987 for H. J. Chao, S. H. Lee, and L. T. Wu and assigned to the assignee hereof.)

A key element in such a packet network is a large capacity, broadband self-routing packet switch. A self-routing packet switch typically comprises a Batcher-banyan network implemented in CMOS using VSLI (see, e.g. Batcher-banyan Packet Switch With Output Conflict Resolution Scheme, U.S. patent application Ser. No. 919,793 filed on Oct. 16, 1986 for E. Arthurs and Y-NJ Hui and assigned to the assignee hereof), now U.S. Pat. No. 4,817,984, issued Mar. 28, 1989. The Batcher-banyan based switch, like other existing electronic switches, requires the demultiplexing of incoming multigigabit optical transmission channels into sub-rate channels. These lower rate data streams are switched and then remultiplexed up to the multigigabit optical transmission rate after the switch.

It is an object of the present invention to provide a packet switch which, in contrast to the above-described electronic switches, utilizes optical components and devices to implement switching functions.

It is a further object of our invention to provide a packet switch in which both internal and external collisions of packets are prevented.

SUMMARY OF THE INVENTION

The present invention is a packet switch which receives packets on optical fiber input trunks and switches them to appropriate optical fiber output trunks. The routing within the switch is done on the basis of packet header addressing information.

Because the inventive switch processes packets of information from input optical fiber trunks to output optical fiber trunks, from a system viewpoint the switching may be viewed as an all optical operation. Nevertheless, the inventive switch internally performs a variety of functions using both optical and electronic components. The inventive switch exploits the inherent advantages of electronic and optical devices for the specific functions they are best suited to perform. That is, electronic components are used for the memory and logic functions, and optical components for routing and interconnection. Thus, the high-throughput characteristics of multi-wavelength optical components are combined with the flexible processing power of electronic devices to form a hybrid electronic and optical packet switch which represents a significant departure from the traditional all-electronic packet switches.

In a particular embodiment, the hybrid packet switch of the present invention comprises an internally non-blocking, high throughput optical network for routing signals in optical form from specific input ports to specific output ports. A second optical network is used to provide output port status information to the input ports for arbitration and control. Packet storage and control processing at the input ports is performed by electronic circuitry.

In accordance with an aspect of our invention the control network parallels the transport network but provides information from the output port to the input port about the availability of the selected output port. Both networks are optical and the selectivity is based on tuning laser transmitters and receivers to selected frequencies.

DETAILED DESCRIPTION OF THE INVENTION

Figure 1:
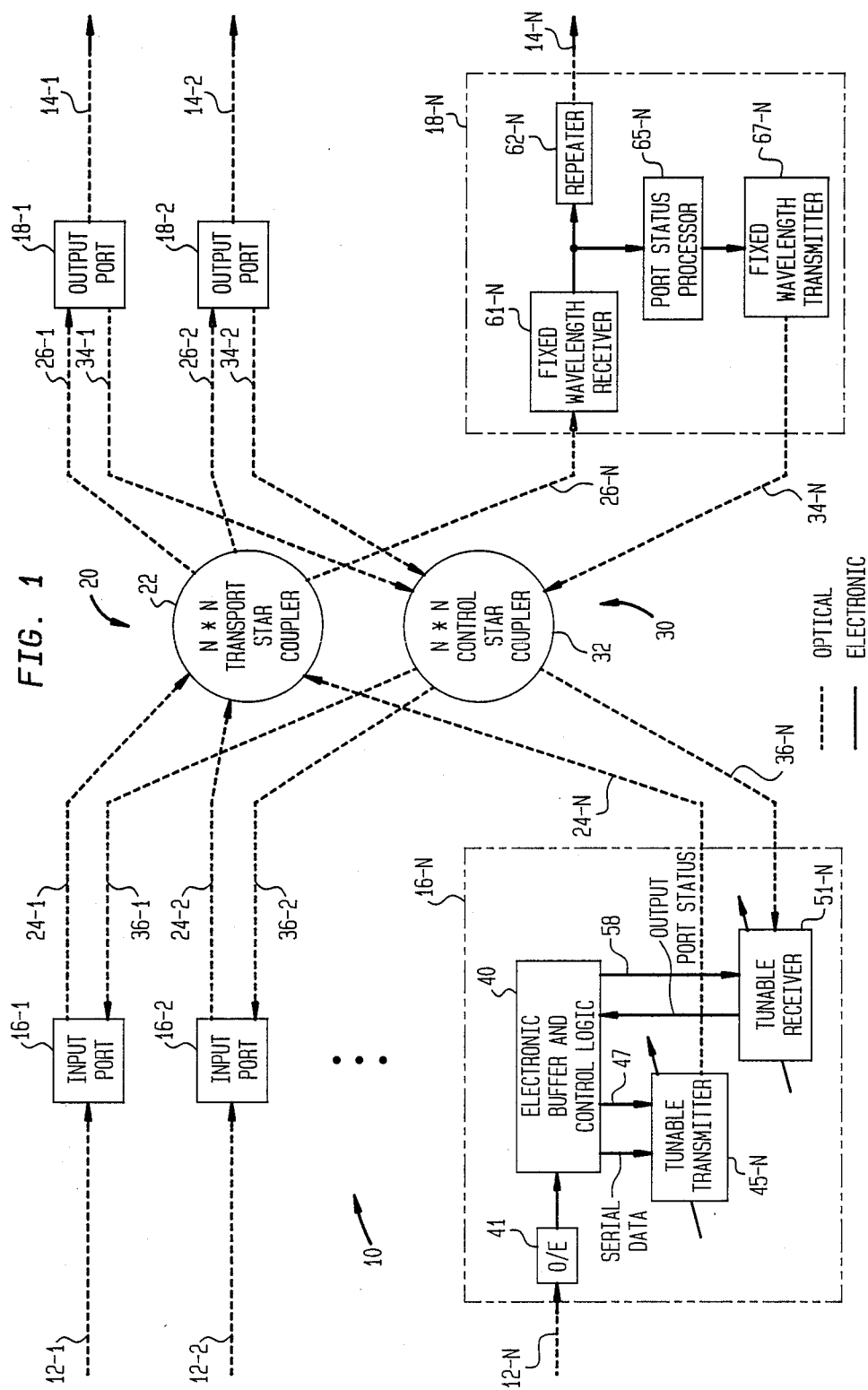
FIG. 1 is a schematic representation of a hybrid packet switch comprising optical and electronic components in accordance with an illustrative embodiment of the present invention.

In FIG. 1, a hybrid packet switch comprising optical and electronic components is schematically illustrated. A packet arriving on one of the optical fiber input trunks 12-1, 12-2 . . . 12-N is routed by the packet switch to one of the optical fiber output trunks 14-1, 14-2 . . . 14-N based on address information contained in the packet header. In FIG. 1 and in all succeeding figures electrical connections are illustrated with solid lines and optical connections using optical fibers are illustrated in phantom lines. The switch comprises a plurality of input ports 16-1, 16-2, . . . 16-N. Each of the input ports is connected to one of the input optical fiber trunks 12-1, 12-2, 12-N. The input port 16-N is shown with some detail in FIG. 1. The switch also comprises a plurality of output ports 18-1, 18-2, . . . 18-N. Each of the output ports is connected to one of the outgoing optical fiber trunks 14-1, 14-2, . . . 14-N. The output port 18-N is shown with some detail in FIG. 1.

In accordance with our invention, the switch also comprises two optical networks. The optical network 20 comprises an $N \times N$ star coupler 22, the optical fibers 24-1, 24-2 . . . 24-N which connect the input ports 16 to the star coupler 22, and the optical fibers 26-1, 26-2, . . . 26-N which connect the star coupler 22 with the output ports 18-1, 18-2, . . . 18-N. The network 20 is an $N \times N$ transport network which serves to transport serial data in optical form from specific input ports to specific output ports.

Similarly, the optical network 30 comprises an N×N star coupler 32, the optical fibers 34-1, 34-2 . . . 34-N which connect the output ports 18 to the star coupler 32, and the optical fibers 36-1, 362, . . . 36-N which connect the star coupler 32 to the input ports 16. The network 30 is an N×N control network that transmits output port status information from the output ports to the input ports.

Optical signals in the form of data packets arriving at the input port 16-N, for example, via incoming optical fiber input trunk 12-N are converted to electronic form using optical-to-electronic converter 41. The data packets, now in electronic form, are processed and stored by means of the electronic buffer and control logic circuitry 40.

Figure 2:
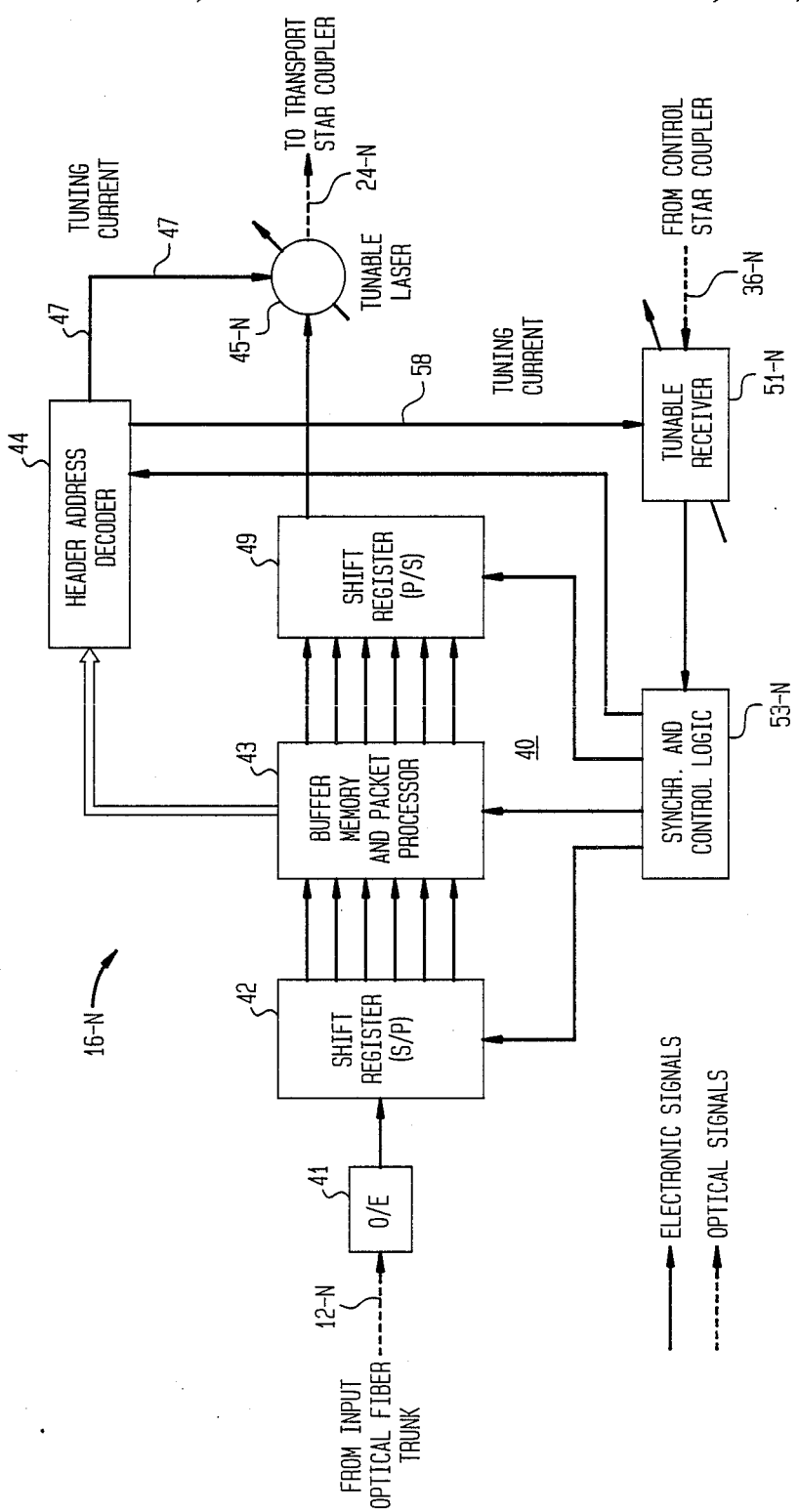
FIG. 2 schematically illustrates an input port comprising part of the switch of FIG. 1.

The circuitry 40 of the input port 16-N of FIG. 1 is shown in greater detail in FIG. 2. Electronic signals leaving the optical-to-electronic converter 41 are converted to parallel form by means of the shift register 42, which shift register serves as a serial-to-parallel converter. The shift register serves to convert bit serial packets into word parallel packets of width B. Thus, further processing of packet information in the electronic domain, such as storage and decoding, can be done at speeds that are B times slower than the incoming optical bit rates. The packets in parallel form are stored in the buffer 43. Each packet includes a header which contains output port address information. This output port address information is decoded by means of the header address decoder 44 to produce a specific output port address to which a packet is to be routed. Each packet is then transmitted via the network 20 to the specific output port.

Each input port comprises a tunable optical transmitter such as the tunable laser 45-N contained in the input port 16-N of FIGS. 1 and 2. Each output port 18 includes a fixed wavelength receiver (such as the receiver 61-N contained in the output port 18-N) adapted to detect a particular wavelength specific to the output port. Thus, to transmit a packet from a specific input port to a specific output port, the tunable transmitter in the specific input port is tuned to the specific wavelength of the fixed receiver of the specific output port (for example, via line 47 in FIGS. 1 and 2) based on information contained in the packet header. The packet to be transmitted is encoded on the specific wavelength and transmitted via an optical fiber (such as optical fiber 24-N) to the star coupler 22. A fraction of the power at this specific wavelength is transmitted from the star coupler 22 to all of the output ports 18 via the fibers 26. However, only the desired output port has a receiver (e.g. receiver 61-N) adapted to detect information encoded on the specific wavelength.

More particularly, as shown in FIG. 2, the tunable transmitter (e.g. transmitter 45-N) is tuned to a specific wavelength via line 47 using signals provided by the header address decoder 45. The transmitter 45-N is then modulated with information comprising a data packet stored in the memory 43. Before modulation, the stored packet is converted from parallel to serial form using shift register 49. The modulated radiation from the transmitter 45-N is transmitted to the star coupler 22 via the fiber 24-N.

From the star coupler 22, the packet is transmitted via an optical fiber (e.g. 26-N) to an output port (e.g. 18-N) where the packet is detected by a fixed wavelength receiver (e.g. 61-N of FIG. 1). The packet signal is amplified using a repeater (e.g. repeater 62-N of FIG. 1) and transmitted out of the output port via the appropriate outgoing optical fiber trunk (e.g. 14-N). The repeater comprises an electronic-to-optical converter.

Figure 3:
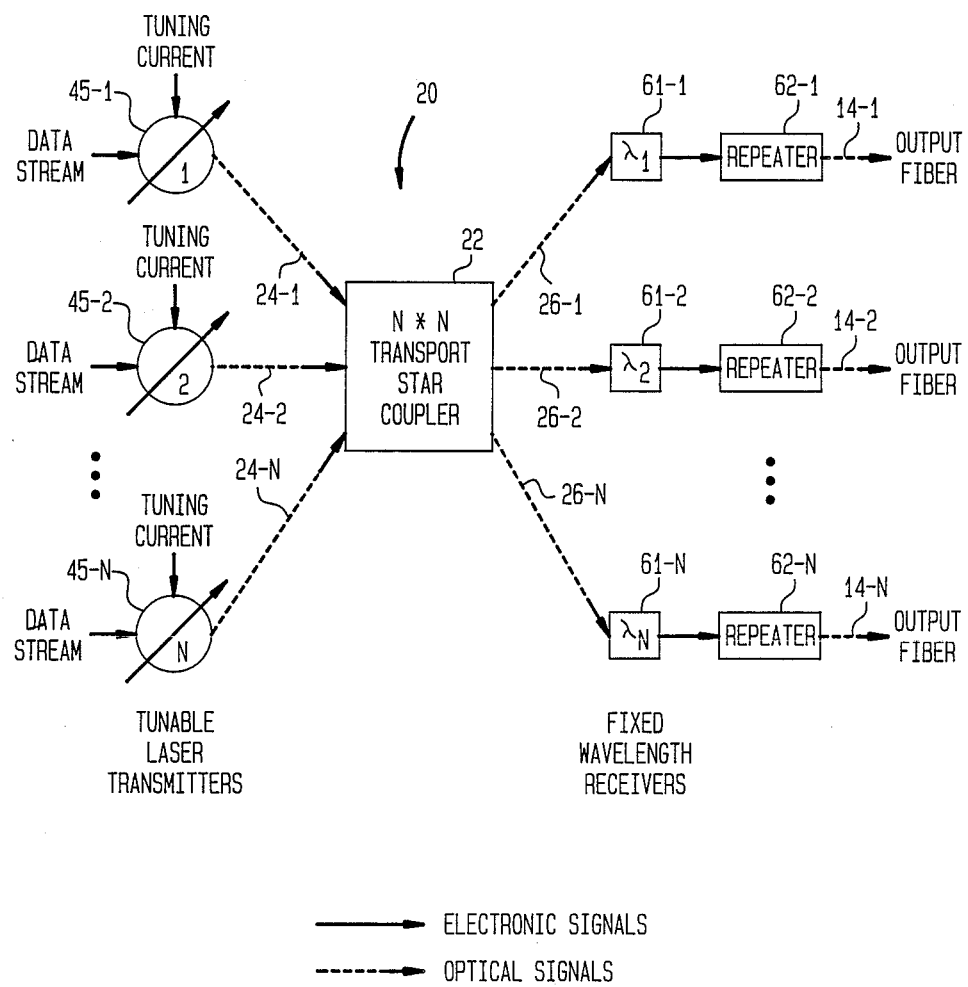
FIG. 3 schematically illustrates a multi-wavelength optical interconnection network for use in connection with the switch of FIG. 1.

As shown in FIG. 3, each of the fibers 24-1, 24-2, 24-N connects a tunable transmitter 45-1, 45-2 . . . 45-N in one of the input ports to the star coupler 22. Similarly, the fibers 26-1, 26-2 . . . 26-N connect the star coupler 22 to the fixed wavelength receivers 61-1, 61-2, . . . 61-N in the output ports, which receivers are adapted to detect wavelengths $\lambda_1, \lambda_2, \ldots \lambda_N$ respectively. Each of the fixed wavelengths receivers 61-1, 61-2 outgoing optical fiber trunk 14-1, 14-2, . . . 14-N. A fraction of the power from each transmitter 45 is transmitted via the star coupler 22 to all the receivers 61. However, each receiver 61 detects only the information encoded on its unique wavelength. Thus, using the transport network 20, a plurality of packets can be simultaneously routed from specific input ports to specific output ports.

The switch of our invention has a very high peak throughout by virtue of the use of multi-wavelength optics for the interconnection network used to transport data from the input ports to the output ports. The network 20 has no internal collisions, i.e., because packets bound for different output ports are encoded on different wavelengths, there is no possibility of an internal collision resulting in the loss of a packet. On the other hand, it is possible to have external collisions if two transmitters were to simultaneously send packets to the same output port. To prevent such external collisions, the control network 30 is provided.

Each output port (e.g. output port 18-N of FIG. 1) includes a port status processor (e.g. 65-N). The status processor is connected to the output of the fixed wavelength receiver (e.g. 61-N) so that it can determine whether the particular output port is busy (i.e. is receiving a packet) or is free and able to receive a packet from an input port via the transport network 20.

Figures 4, 5A, 5B:
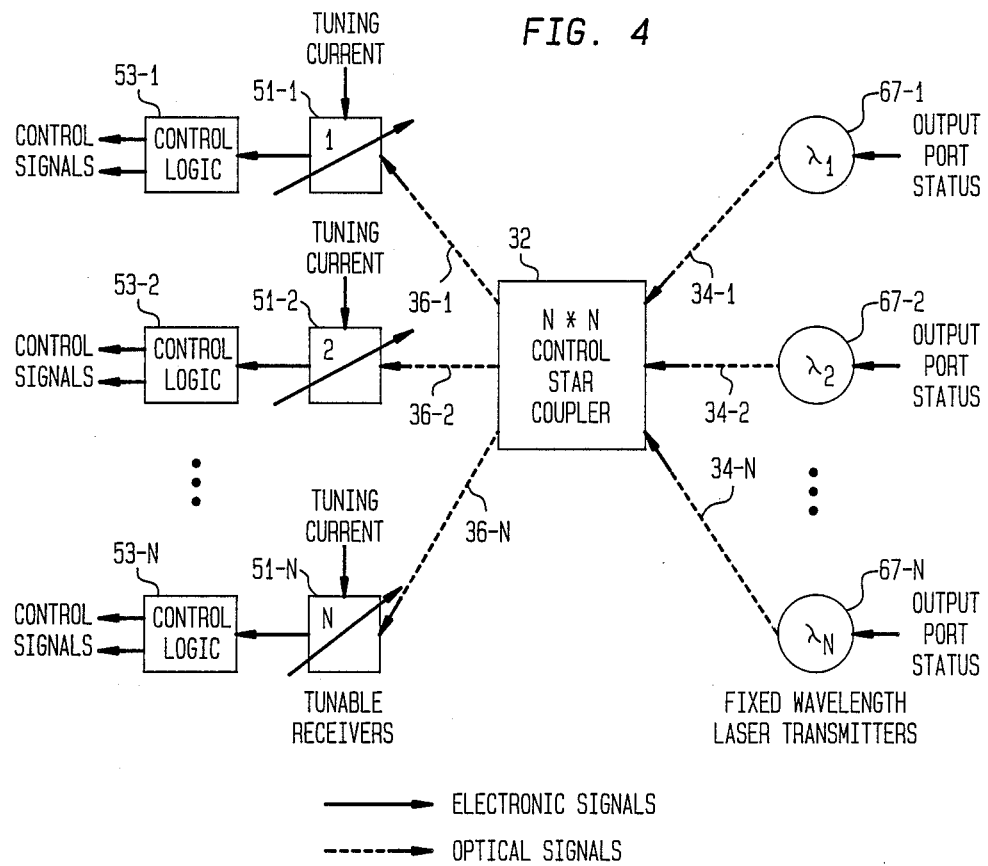
FIG. 4 schematically illustrates an optical control network for use in connection with the switch of FIG. 1.
FIGS. 5A and 5B illustrate protocols for use in connection with the switch of FIG. 1.

Output port status information is transmitted from the output ports to the input ports via the control network 30, as shown in FIG. 4. Each output port 18 includes a fixed wavelength transmitter 67-1, 67-2 . . . 67-N which transmits output port status information on a unique wavelength characteristic of the particular output port. The status information from each output port is transmitted via the optical fibers 34 to the star coupler 32 which in turn transmits a fraction of the power from all of the fixed wavelength transmitters 67 to each input port 16. Each input port 16 includes a tunable receiver 51-1, 51-2 . . . 51-N which is tunable to one of the wavelengths transmitted by the fixed wavelength output port transmitters 67. Information detected by the tunable receivers 51-1, 51-2 . . . 51-N is transmitted to the control logic 53-1, 53-2 . . . 53-N.

When an input port receives a packet, signals transmitted via line 58 (see FIG. 1 and 2) cause the corresponding receiver 51 (e.g. receiver 51-N of FIG. 1, 2 and 4) to tune to the unique wavelength transmitted by the specific output port to which the packet is to be transmitted. Status information from the specific output port is processed by control logic (e.g. 53-N of FIGS. 2 and 4) to determine when the packet is to be transmitted from the input port to the specific output port. Thus, when an incoming packet is received at an input port, the packet is stored in memory (e.g. memory 43 of FIG. 2) until status information is received indicating that the specific output port to which the packet is to be transmitted is free.

In short, a packet switch comprising electronic input buffer and control circuitry, an optical transport network and an optical control network has been disclosed.

The electronic input buffer and control circuitry in each input port performs a variety of functions including conversion of the input packets from bit serial optical form to word parallel electronic form, storage of the input packets, decoding of the packet header address information, and generating electronic signals for tuning the optical transmitter and receiver. If the bit serial optical signals are converted to word parallel signals of width B, then the electronic circuitry can process signals at rates that are B times slower than the optical serial bit steam.

The routing and distribution of packets from the input ports to the output ports is done using the multi-wavelength optical interconnection network 20. Each of the N input ports has an optical transmitter and each of the N output ports has an optical receiver. Each transmitter is connected through an optical fiber to an N×N star coupler and the N outputs of the star coupler are connected to the output port receivers. Each output port receiver is associated with a unique characteristic wavelength, using an optical bandpass filter or a fixed heterodyne detector. At the input ports, each transmitter illustratively comprises one or more tunable laser diodes to cover the required wavelength range. Data modulation for transmission could be done directly on the laser diode, or alternatively by using an external modulation device, such as Lithium Niobate components. Packets are routed from input ports to output ports by tuning each input laser transmitter to the appropriate output port receiver wavelength. Such transmission of packets in bit-serial optical form takes place at typical rates of 2Gbit/sec which is approximately the capacity of an optical fiber trunk. The required tuning speed of the laser diodes depends on the lengths of the data packets. Illustratively, assuming a packet size of 1000 bits, the transmission lasers should be tunable between any two arbitrary wavelengths in times on the order of 0.03 microseconds. Examples of suitable laser diodes include Tunable Distributed Feedback and Distributed Bragg Reflector laser diodes. A network similar to the transport network 20 of FIG. 3 is discussed in detail in U.S. patent application Ser. No. 948,244 entitled Multi Wavelength Optical Telecommunication Network filed for N. K. Cheung, H. Kobrinski and K. W. Loh on Dec. 31, 1986 and assigned to the assignee hereof; see also our prior application Ser. No. 046,912, filed May 6, 1987, entitled "Fast Optical Cross-Connect for Parallel Processing Computers", now U.S. Pat. No. 4,834,483, issued May 30, 1989.

In accordance with an aspect of our invention, to prevent external packet collisions, logic circuits at the output ports generate the proper control information to be sent to the input ports. This information is converted to an optical signal at a unique wavelength associated with each output port. Using a fixed wavelength laser transmitter, control information is broadcasted to the input ports using a second N×N star coupler. At each input port, a tunable receiver selects the control information relevant to the output port or ports for which it is preparing transmission. Electronic control circuits at the input ports process the output port information and produce the necessary control signals for the overall arbitration and control of the switch. Because the flow of control information occurs at relatively moderate bit rates, electronic components are generally sufficiently fast for processing of the control information. Instead of the network illustrated in FIG. 5, the control information may be transmitted from the output ports to the input ports using Optical Code Division Multiple Access techniques. In this case, the output ports would code the control information with their individual signatures and broadcast it over a single wavelength through the control N×N star coupler. An example of a suitable CDMA technique is disclosed in U.S. patent application Ser. No. 065,023 entitled Optical Telecommunication System Using Code Division Multiple Access filed for C. A. Brackett, J. P. Heritage, J. A. Salehi and A. M. Weiner on June 22, 1987 and assigned to assignee hereof.

The performance of any packet switch strongly depends on the efficiency and flexibility of the control algorithms that can be implemented.

A typical arbitration sequence based on an individual port polling protocol will be described, as an example. The logical steps at input port j and output port i are presented. These steps are simultaneously occurring in a similar way at each of the N input and N output ports during operation of the inventive packet switch. For purposes of simplicity, it is assumed that the unique wavelength associated with each output port is the same for the transport network and the control network.

Input port protocol (at port j)

1. Decode packet header address information to establish the output port wavelength $\lambda_i$.
2. Tune the input port laser transmitter to the required output port wavelength $\lambda_i$.
3. Tune the input port receiver to the required output port wavelength $\lambda_i$.
4. Interpret the control information received at wavelength $\lambda_i$ from the output port over the control star coupler.
5. When output port is available, transmit the packet or packets at wavelength $\lambda_i$ over the transport star coupler.
6. Begin a new cycle.

Output port protocol (at port i)

1. Poll input port j by broadcasting output port control information at wavelength $\lambda_i$ over the control star coupler.
2. Stop polling when transmission over the transport star coupler is received from input port j, or because of timeout (i.e. the running of a predetermined time period).
3. Move to next input port $j \rightarrow j+1$.
4. Begin new cycle by polling new input port.

This illustrates the basic individual port polling procedure. Using the individual port polling approach no collisions occur at the output ports, since the input ports are sequentially polled by the output ports one at a time. However, using individual polling, the number of polling cycles increases linearly with the number of ports.

An alternative control algorithm for routing packets through the inventive packet switch is as follows. Assume that time is divided into fixed length slots. The length of a slot is sufficient to contain a polling step, i.e., an output port can poll an input port and the port can respond by transmitting a packet. Further, the slot sequence is divided into groups of consecutive slots called frames. Bandwidth is assigned to the highbandwidth real-time traffic during call setup in units of a particular number of slots per frame. The table of FIG. 5A schematically illustrates the pre-assignment of the slots comprising each frame. The example shown in FIG. 5A illustrates slot assignment for a switch comprising four input ports and for a frame structure comprising four slots. In the table of FIG. 5A there is one row for each of the four input ports and one column for each of the four slots per frame. Thus, call A appears in time slot 1 and time slot 3 from input port 1 to output port 2. This indicates a call setup from input port 1 to output port 2 with a bandwidth of 2. Call C, on the other hand, is setup from input port 2 to output port 1 with a bandwidth of 1. (Note that each output port can only appear once in any column).

Thus, from the table of FIG. 5A we see that there are 5 preassigned calls, labelled at A, B, C, D, and E with the port and bandwidth assignments shown in the table of FIG. 5B.

The preassigned allocation of bandwidth illustrated in FIGS. 5A and 5B may be implemented by high priority polling sequences from each output port. For example, the high priority polling sequence for output port 3 in the above example is: poll input port 4 in slot 1, input port 1 in slot 2, and input port 4 in slot 3.

When an output port is not executing a high priority poll, it executes a tree polling algorithm to satisfy low priority demand access traffic, which traffic is not accounted for in the preassignment scheme of FIG. 5A and 5B. Assume that the number of input ports is N=2k, so that N is a power of two. The input ports are imagined to be the leaves of a full binary tree. Since on the average, it is expected that there will be less than one low priority packet at each input port for any given output port, a tree polling algorithm is used, with collision detection to arbitrate low priority requests.

The basic tree polling algorithm is as follows. Start a low priority polling cycle by polling all input ports. If there is not more than one packet for the output port, the cycle is complete in one slot. If there is more than one packet then a collision is detected and the input ports (leaves of the tree) comprising left and right subtrees are polled. This step is repeated recursively until all collisions are resolved.

For example, suppose there are 8 input ports numbered 1 through 8 (from left to right) on the tree. In a first slot, output port 5 executes a low priority cycle with input ports 1 and 6 having packets for output port 5. In a second slot, the left subtree comprising input ports 1–4 is polled and there is successful transmission of the low priority packet from input port 1. In a third slot, the right subtree comprising input ports 5–8 is polled and there is successful transmission of the low priority packet from input port 5.

Thus, it takes 3 slots to transmit two packets. If the ports are polled individually, then no collisions ensue, but all low priority polling cycles are of length N. That is, it will require 8 polls with individual polling to transfer the two packets.

Finally, the above-described embodiments of the invention are intended to be illustrative only. Numerous alternative embodiments may be devised by those skilled in the art without departing from the spirit and scope of the following claims.

What is claimed is:

1. A hybrid optical and electronic packet switch for routing data packets from specific incoming optical fiber trunks to specific outgoing optical fiber trunks, said packet switch comprising:
   a plurality of output ports connected to said outgoing optical fiber trunks,
   a plurality of input ports connected to said incoming optical fiber trunks, said input ports including electronic circuit means for storing said packets and for processing status information received from said output ports,
   a first internally collisionless optical network for simultaneously transmitting a plurality of said packets in optical form from specific ones of said input ports to specific ones of said output ports, and
   a second optical network for transmitting said status information from said output ports to said input ports so that said input ports can determine when packets may be transmitted to specific output ports without two packets being transmitted to the same output port at the same time.

2. The packet switch of claim 1 wherein each of said input ports comprises a tunable optical transmitter and a tunable optical receiver.

3. The packet switch of claim 2 wherein each of said output ports comprises a fixed optical receiver and a fixed optical transmitter.

4. A hybrid optical and electronic packet switch for routing data packets from specific incoming optical fiber trunks to specific outgoing optical fiber trunks, said packet switch comprising:
   a plurality of output ports connected to said outgoing optical fiber trunks,
   a plurality of input ports connected to said incoming optical fiber trunks, said input ports including electronic circuit means for storing said packets and for processing status information received from said output ports,
   a first internally collisionless optical network for simultaneously transmitting a plurality of said packets in optical form from specific ones of said input ports to specific ones of said output ports,
   a second optical network for transmitting said status information from said output ports to said input ports so that said input ports can determine when packets may be transmitted to specific output ports without two packets being transmitted to the same output port at the same time,
   wherein each of said input ports comprises a tunable optical transmitter and a tunable optical receiver,
   wherein each of said output ports comprises a fixed optical transmitter and a fixed optical receiver, and
   wherein said first optical network comprises
   a first star coupler,
   a first set of optical fibers for connecting said tunable transmitters in said input ports to said first star coupler, and
   a second set of optical fibers for connecting said first star coupler with said fixed receivers in said output ports.

5. The packet switch of claim 4 wherein said second optical network comprises
   a second star coupler,
   a third set of optical fibers for connecting said fixed transmitters in said output ports with said second star coupler, and
   a fourth set of optical fibers for connecting said second star coupler with the tunable receivers in said input ports.

6. A hybrid optical and electronic packet switch for routing data packets from specific incoming optical fiber trunks to specific outgoing optical fiber trunks, said packet switch comprising:
- a plurality of output ports connected to said outgoing optical fiber trunks,
- a plurality of input ports connected to said incoming optical fiber trunks, said input ports including electronic circuit means for storing said packets and for processing status information received from said output ports,
- a first internally collisionless optical network for simultaneously transmitting a plurality of said packets in optical form from specific ones of said input ports to specific ones of said output ports, and
- a second optical network for transmitting said status information from said output ports to said input ports so that said input ports can determine when packets may be transmitted to specific output ports without two packets being transmitted to the same output port at the same time,
- wherein each of said input ports comprises
- an optical-to-electronic converter for converting incoming packets into bit-serial electronic form,
- a serial-to-parallel converter for converting said packets from serial to parallel form,
- a buffer for storing said packets in parallel form,
- decoding means for decoding address information contained in said packets,
- a tunable optical transmitter, said optical transmitter being tunable to a specific wavelength based on said address information, and
- means for reading said packets from said buffer and for converting said packets into serial form so that said packets can be modulated onto the specific wavelength to which said transmitter is tuned.

7. The packet switch of claim 6 wherein each of said input ports further comprises
- a receiver tunable to a specific wavelength based on said address information for detecting status information from a specific output port, and
- electronic control logic for processing said status information.

8. A hybrid optical and electronic packet switch for routing data packets from specific incoming optical fiber trunks to specific outgoing optical fiber trunks, said packet switch comprising:
- a plurality of output ports connected to said outgoing optical fiber trunks,
- a plurality of input ports connected to said incoming optical fiber trunks, said input ports including electronic circuit means for storing said packets and for processing status information received from said output ports,
- a first internally collisionless optical network for simultaneously transmitting a plurality of said packets in optical form from specific ones of said input ports to specific ones of said output ports,
- a second optical network for transmitting said status information from said output ports to said input ports so that said input ports can determine when packets may be transmitted to specific output ports without two packets being transmitted to the same output port at the same time,
- wherein each of said output ports comprises
- a fixed wavelength detector,
- a repeater comprising an electronic-to-optical converter for amplifying signals detected by said fixed wavelength detector,
- a processor for providing information as to the status of the output port, and
- a fixed wavelength transmitter for transmitting said status information.

9. A self-routing packet switch for routing packets from specific incoming optical fiber trunks to specific outgoing optical fiber trunks comprising:
- a plurality of input ports connected to said incoming optical fiber trunks,
- a plurality of output ports connected to said outgoing optical fiber trunks,
- a first internally collisionless optical network for simultaneously routing a plurality of said packets from specific ones of said input ports to specific ones of said output ports based on address information contained in said packets,
- a second optical network for transmitting output port status information from said output ports to said input ports, and
- electronic means at said input ports for processing said status information to determine when packets are to be transmitted to specific output ports to insure that two packets are not transmitted to the same output port at the same time.

10. A packet switch in accordance with claim 9 wherein said input ports include electronic circuit means for buffering said packets.

11. A packet switch for routing data packets from specific incoming optical fiber trunks to specific outgoing optical fiber trunks and comprising,
- a plurality of input ports connected to said incoming optical fiber trunks and a plurality of output ports connected to said outgoing optical fiber trunks,
- means for preventing internal collisions of packets within the switch and comprising a transport optical network, first transmitter means in said input ports and first receiver means in said output ports uniquely tuned to the same wavelength for each particular packet, and
- means for preventing external collisions of packets and comprising a control optical network, second transmitter means in said output ports and second receiver means in said input ports uniquely tuned to the same wavelength for each particular packet,
- wherein said first transmitters and second receivers within said input ports are tunable depending upon the address of the output port selected by each packet and said second transmitters and first receivers in said output ports are of a fixed wavelength dependent upon the particular output port.

12. A packet switch in accordance with claim 11 wherein said input ports further comprise electronic buffer and control logic means for tuning said first transmitter and said second receiver dependent upon the decoded header address of the packet being transmitted.

* * * * *